No. 688,640. Patented Dec. 10, 1901.
W. HEINCKE.
METHOD OF MAKING HOLLOW BODIES EMPLOYED IN THE MANUFACTURE OF TOY FIGURES.
(Application filed Aug. 6, 1901.)
(No Model.)
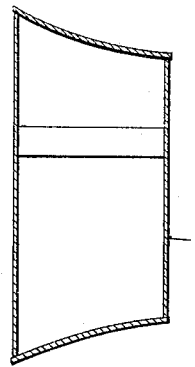
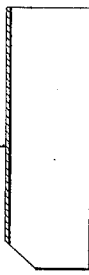
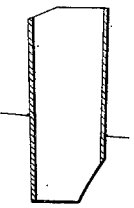
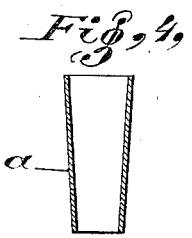
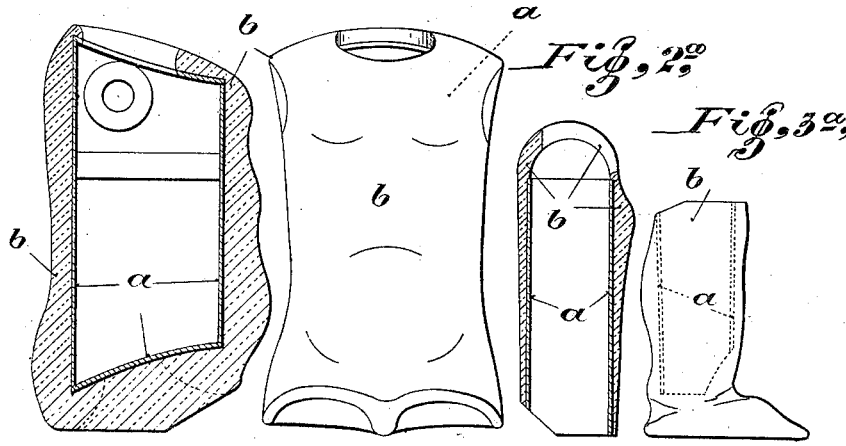
Witnesses:
Inventor
William Heincke
By James L. Norris
Atty

UNITED STATES PATENT OFFICE.

WILLIAM HEINCKE, OF WALTERSHAUSEN, GERMANY.

METHOD OF MAKING HOLLOW BODIES EMPLOYED IN THE MANUFACTURE OF TOY FIGURES.

SPECIFICATION forming part of Letters Patent No. 688,640, dated December 10, 1901.

Application filed August 6, 1901. Serial No. 71,077. (No model.)

*To all whom it may concern:*

Be it known that I, WILLIAM HEINCKE, manufacturer, a subject of the Duke of Saxe-Coburg-Gotha, residing at Waltershausen, in the Duchy of Saxe-Coburg-Gotha, German Empire, have invented a certain new and useful Improvement in Methods of Making Hollow Bodies Employed in the Manufacture of Toy Figures, of which the following is a specification.

My invention relates to an improved method of the production of hollow articles, such as dolls.

Heretofore toys, particularly dolls, animal figures, and the like, were so produced that the hollow body thereof was filled with papier-mâché or other suitable material and were formed or molded in two halves or parts, these parts being placed face to face and then secured together. This method is involved and necessitates many operations. As the parts of the body may be easily separated at the joints and as the attachment at this point is ineffective, it is necessary that some additional means be employed to secure the parts together.

The object of the present invention is to produce the body without joints. By this means not only is the manufacture considerably simplified, but distortion or twisting of the body is avoided.

In order that the invention may be the better understood, drawings are appended, in which—

Figure 1 illustrates, by way of example, the frame for the body of a doll; Fig. 2, the frame for the upper part of the thigh; Fig. 3, a leg-frame; Fig. 4, a forearm-frame; Figs. 1$^a$ and 1$^b$ illustrate, respectively, a section and elevation of a finished body; Fig. 2$^a$, the finished upper part of thigh in section, and Fig. 3$^a$ the finished leg.

In carrying the invention into effect a hollow body or core $a$ is formed of some strong material—such as cardboard, paper, papier-mâché, celluloid, or the like—of an outline somewhat resembling the form of the finished article, and this is then introduced into a mold or part of a mold, in which has previously been placed a suitable composition or paste $b$. The parts of the mold are then brought together and subjected to pressure, then opened, and the contents, which have assumed an outline corresponding to the surface of the mold, removed and placed aside to dry. Bodies so constructed are very firm, are strong, and require little or no work on the joined parts of the body, as these fit closely together.

Having now particularly described and ascertained the nature of my said invention and in what manner the same is to be performed, I declare that what I claim is—

A method of making hollow bodies employed in the manufacture of toy figures, consisting of forming a one-part hollow core of desired shape from suitable material, introducing said core into a suitable composition, suitably molding said composition integral with the periphery of the core to form a hollow article, and then drying the hollow molded article.

In testimony whereof I have hereunto set my hand in presence of two subscribing witnesses.

WILLIAM HEINCKE.

Witnesses:
 THEKLA NENNER,
 ELLWOOD NILSORD.